United States Patent Office 2,694,056
Patented Nov. 9, 1954

2,694,056

PIGMENTARY SUBSTANCES OF THE AZO TYPE

Thomas E. Ludwig and Oswald E. Knapp, Chicago, Ill., assignors to The Sherwin-Williams Company, Cleveland, Ohio, a corporation of Ohio No Drawing. Application December 10, 1951, Serial No. 260,932

3 Claims. (Cl. 260—197)

This invention relates to an improved class of azo pigment of a water-insoluble character having improved stability upon exposure to heat, light, solvents, etc., than presently available pigments of similar hue.

More particularly, this invention relates to the water-insoluble metal salts of the coupling of diazotized dichloroanilinesulfonic acid with 2-naphthol to produce pigmentary substances of light red to medium red shade characterized by good light-fastness and stability, particularly when incorporated as a pigmentary component of exterior coating compositions, printing inks, baking enamels, and plastic materials wherein pigments are dispersed for coloration thereof.

In addition to the excellent durability of the class of azo pigments herein described, coating compositions containing the said pigments are of further advantage over many pigments of red hue in their non-bleeding character when overcoated with white or light colored compositions of similar nature, or when in contact with organic solvents, fats, oils, etc. Further superiority resides in their improved heat stability in thermally processed plastic masses and baking enamels.

Heretofore a number of azo compounds of red hue have been manufactured by diazotizing substituted anilines and coupling with 2-naphthol, 2-hydroxy-3-naphthoic acid and various sulfonated and aminated naphthols. The majority of the resultant products are useful only in the textile arts. A few of these dyestuffs have been laked on substrates or precipitated as metal salts to render them useful for pigmentary purposes. The azo pigment art has advanced but little since the early part of the century with the coupling of parachloro-meta-toluidine-orthosulfonic acid with 2-naphthol (U. S. Patent 733,280; July 7, 1903); the same amine with 2-hydroxy-3-naphthoic acid (U. S. Patent 983,486; February 7, 1911); and para-chloroaniline-orthosulfonic acid with 2-hydroxy-3-naphthoic acid (U. S. Patent 743,071; November 3, 1903). The only recent patent of which we are aware in this field relates to the selection of the manganese salt of the coupling described in U. S. Patent 743,071 as disclosed in U. S. Patent 2,225,665 issued December 24, 1940. It is there stated that the manganese salt of that coupling yields pigmentary material of improved light-fastness peculiar to that metal ion.

Through additional research on azo pigments, we have discovered two unusual and unexpected results. One result is that upon introduction of an additional chlorine atom into the monochloroaniline sulfonic acid that the coupling of the dichloroaniline sulfonic acid with 2-naphthol and precipitation of a water-insoluble metallic salt yields a class of pigments of improved light and heat stability of light red to maroon hue, and that while the calcium salt is preferred, other metallic cations may be used in place of the calcium ion without deterioration in the stable quality of the pigment. The calcium, manganese, magnesium, aluminum, nickel, lead, zinc, tin and potassium salts of the above coupling, produce the more useful of the metal salts characterized by superior light-fastness. Of the isomers of dichloroaniline sulfonic acid used in coupling with 2-naphthol, the 2,3-dichloroaniline-5-sulfonic acid and the 3,4-dichloroaniline-6-sulfonic acid proved to be outstandingly superior for our pigmentary purposes. Of these two isomers, the 2,3-dichloroaniline-5-sulfonic acid is preferred, particularly because the calcium salt thereof has been found to be sufficiently similar in hue to sodium lithol red to be an excellent substitute therefor in shade, but superior to that pigment in many important qualities as will be shown. Sodium lithol red is the sodium salt of the coupling of 2-naphthylamine-1-sulfonic acid and 2-naphthol.

In our copending application, U. S. Serial Number 260,931 filed of even date herewith, five of the ring isomers of dichloroaniline sulfonic acid were found valuable in that coupling which was most unusual. In the present instance, as noted above, only two of the dichloroaniline sulfonic acid isomers are believed commercially important in the production of azo pigments of superior quality.

It has been found that the addition of more than one mole of chlorine to the aniline sulfonic acid molecule introduces valuable improvements in the characteristics of certain of the water insoluble metal salts of the coupling of the isomers of dichloroaniline sulfonic acid with 2-naphthol.

It has been further found that the calcium salts of the preferred couplings very closely resemble the hue of sodium lithol red and yet produce a pigment of superior qualities as compared with sodium lithol red.

It is the broad object of this invention to provide a novel, useful and improved class of red azo pigments comprising the water-insoluble metal salts of the coupling of diazotized dihalogen substituted anilinemonosulfonic acids and, more particularly, the dichloroaniline sulfonic acids selected from the group consisting of 2,3-dichloroaniline-5-sulfonic acid and 3,4-dichloroaniline-6-sulfonic acid with 2-naphthol.

It is more specifically an object of this invention to provide an improved class of red azo pigments of superior light-fastness and general durability comprising a water-insoluble metal salt of the above coupling, the metal ion of which is selected from the group consisting of manganese, magnesium, aluminum, nickel, lead, zinc, tin and potassium. The calcium salts are outstandingly of value.

It is the specific object of this invention to provide a pigment of the same general hue as sodium lithol red but of greater pigmentary value, which comprises the calcium salt of the coupling of diazotized 2,3-dichloroaniline-5-sulfonic acid with 2-naphthol.

It is another specific object of this invention to provide a novel red pigmentary substance which comprises the calcium salt of the coupling of diazotized 3,4-dichloroaniline-6-sulfonic acid with 2-naphthol.

The manufacture and synthesis of red to maroon azo pigments within the scope of our discovery are illustrated, but not exhaustively, by the following examples, a part of which are set forth in tabular form, in which the parts are by weight unless otherwise specified.

EXAMPLE I

To a solution of 1200 parts of water and 50 parts of 28% ammonium hydroxide are added 121 parts of 2,3-dichloroaniline-5-sulfonic acid. Solution of the amine is effected by heating the mixture to 45 degrees C. Add 129 parts of 32% HCl and adjust temperature to 0 degrees C. with an excess of ice. Add to the cooled solution 35 parts of sodium nitrite thus diazotizing the amine. Label as Item I.

In a separate vessel 75 parts of 2-naphthol are dissolved in 500 parts water with 25 parts sodium hydroxide by heating. Dilute and cool to 3400 parts total with water and ice to 20 degrees C. Label as Item II.

Item I is added to Item II with good agitation of the reactants. Coupling occurs and the sodium salt of the pigment results.

The pH of the mass is adjusted to 8.3–8.7 and the mass boiled, whereupon the pigment sodium salt is filtered off.

The precipitated salt is reslurried in 9000 parts water and the pH adjusted to between 8.4 and 8.6. The slurry is heated to 95 degrees C. and 80 parts of calcium chloride are added in an aqueous solution. Boil the mixture 10 minutes and filter, wash and dry the precipitate.

The properties of the azo pigment resulting in Example I were compared with those of sodium lithol red. The comparative data is set forth below in Table I.

Table I

| Quality | Product of Example I | Sodium Lithol Red |
|---|---|---|
| Hue | Light yellow shade red. | Light yellow shade red. |
| Hiding Powder | Greater than sodium lithol red. | |
| Light-fastness | Good | Fair. |
| Heat Stability | do | Poor. |
| Non-bleeding character in linseed oil. | Excellent | Some bleeding. |
| Acid resistance | Good | Poor. |
| Alkali resistance | do | Good. |
| Water resistance | Very good | Fair. |

Table II

Following the general procedure and directions of Example I, with the substitutions as noted, the following illustrative specific members of the class of pigments herein disclosed were prepared with the following results.

| Amine | Coupling Component | Salts | Shade [1] | Light Fastness |
|---|---|---|---|---|
| 2,3-dichloroaniline-5-sulfonic acid | 2-naphthol | Ca | Slightly duller and stronger. | Good. |
| Do | do | Mn | Slightly bluer | Do. |
| Do | do | Mg | Slightly lighter and brighter. | Do. |
| Do | do | Al | Stronger and yellower | Do. |
| Do | do | Ni | Darker and duller | Do. |
| Do | do | Pb | Much lighter and yellower. | Do. |
| Do | do | Zn | Moderately lighter | Do. |
| Do | do | Sn | Lighter and yellower | Do. |
| Do | do | K | do | Do. |
| Do | do | Ba [2] | Darker and yellower | Poor. |
| 3,4-dichloroaniline-6-sulfonic acid | do | Ca | Moderately lighter | Good. |
| Do | do | Ba | Weaker and darker | Poor. |
| 2,5-dichloroaniline-4-sufonic acid [2] | do | Ca | Poor color | Not tested. |
| Do | do | Ba | do | Do. |
| 2,4-dichloroaniline-6-sulfonic acid | do | Ca | Lighter and yellower | Poor. |
| 3,4-dichloroaniline-5-sulfonic acid | do | Ca | do | Fair. |

[1] Compared with sodium lithol red.
[2] Considerable water solubility.

The pigments produced in the examples of Table II were thereafter dispersed in a variety of alkyd varnishes, nitrocellulose lacquers and urea-formaldehyde baking varnishes. Films resulting from the above compositions were improved in their bleeding resistance, heat stability, light stability and acid resistance as compared with standards for comparison containing sodium lithol red in similar quantity.

As is well known, pigments of the above class may be further modified in hue and other characteristics by changes in processing techniques, illustrative of which are:

(1) Modification of the amine:
  (a) By use of mixtures of various isomers of dichloroanilinesulfonic acid.
  (b) Use of other amines in conjunction with the dichloroaniline sulfonic acid.
(2) Changes in pH, temperature, concentration of reactants and other physical conditions during the pigment synthesis.
(3) The insoluble pigmentary form created through usage of a combination of metal cations.
(4) Use of ancillary materials in conjunction with the pigment formed.
  (a) Resin treatments.
  (b) Fatty acid treatments.
  (c) Surface active agents including non-ionic, cationic and anionic types.

The above modifications are in no wise intended to be exhaustive, and other changes in the art of pigment manufacture may be adapted to the class of azo pigments herein described.

Other halogens may be substituted for chlorine with correlative modifications in the nature of the product. Chlorine is, however, the preferred halogen in the dihaloaniline sulfonic acid component.

Having illustrated the invention in its preferred form as well as the general scope of its applicability, we claim:

1. A red pigmentary substance of improved light and heat stability consisting essentially of the calcium salt of the azo dyestuff formed upon diazotization of dichloroaniline monosulfonic acid selected from the group consisting of 2,3-dichloroaniline-5-sulfonic acid and 3,4-dichloroaniline-6-sulfonic acid, and coupling the said acid with 2-naphthol.

2. A red pigmentary product consisting essentially of the calcium salt of the diazotization of 2,3-dichloroaniline-5-sulfonic acid and coupling of said acid with 2-naphthol.

3. A red pigmentary product consisting essentially of the calcium salt of the diazotization of 3,4-dichloroaniline-6-sulfonic acid and coupling of said acid with 2-naphthol.

References Cited in the file of this patent

UNITED STATES PATENTS

| Number | Name | Date |
|---|---|---|
| 733,280 | Schirmacher | July 7, 1903 |
| 787,767 | Julius et al. | Apr. 18, 1905 |